United States Patent [19]

Tate et al.

[11] Patent Number: 4,634,990
[45] Date of Patent: Jan. 6, 1987

[54] APPARATUS FOR DEMODULATING DIFFERENTIAL PHASE SHIFT KEYED SIGNALS

[75] Inventors: John C. Tate, Garland; Eric K. Weeren, Carrollton, both of Tex.

[73] Assignee: General Electric Company, King of Prussia, Pa.

[21] Appl. No.: 748,530

[22] Filed: Jun. 25, 1985

[51] Int. Cl.⁴ .................................... H03D 3/00
[52] U.S. Cl. ................................ 329/126; 329/107; 329/122; 375/84
[58] Field of Search ............... 329/104, 107, 110, 122, 329/126, 167, 105; 375/80, 84, 86, 94; 455/205, 214, 337

[56] References Cited

U.S. PATENT DOCUMENTS 4,311,964  1/1982  Boykin .................................. 329/104

Primary Examiner—Eugene R. LaRoche
Assistant Examiner—Robert J. Pascal
Attorney, Agent, or Firm—William Freedman; Henry J. Policinski

[57] ABSTRACT

A demodulating apparatus receives a differential phase shift keyed analog signal which is coupled to the input of a voltage controlled oscillator. The voltage controlled oscillator generates a plurality of pulses at a frequency which is proportional to the amplitude of the analog signal. The pulses are counted during in-phase intervals and intervals which are quadrature phase related to the in-phase intervals. The signs of the differences between (i) the number of in-phase and quadrature phase interval pulses counted during a first bit rate interval and (ii) a reference pulse count number, are determined. The signs of the differences between (i) the in-phase and quadrature phase pulses counted during a second bit rate interval, which follows the first bit rate interval, and (ii) the reference count number, are also determined. A phase change is indicated when the signs of the second in-phase and quadrature phase differences are different from the signs of the first in-phase and quadrature phase differences respectively.

10 Claims, 5 Drawing Figures

APPARATUS FOR DEMODULATING DIFFERENTIAL PHASE SHIFT KEYED SIGNALS

BACKGROUND OF THE INVENTION

This invention relates to apparatus for receiving and executing commands transmitted by means of a modulated carrier signal, and more particularly to apparatus of this type, such as load control receivers, for performing load management functions at a user's location.

A load control receiver is a device used at a customer site to perform load management functions for example to interrupt and reconnect power to customer loads upon command. Such loads are, for example, water heaters, air conditioners, heat pumps, and the like. Typically, commands to interrupt and reconnect such loads are generated at a substation by a substation control unit. The commands are preferably sent utilizing a carrier signal which is transmitted over the power distribution lines which extend from the substation to the user's facility.

Information is impressed on the carrier preferably using a differential phase shift keying (DPSK) modulation technique which, in a high noise environment such as that existing on the power distribution lines, places the interfering signals (noise) in the nulls or orthogonalities of the detector. DPSK detection utilizes the phase of the signal as detected in each baud interval for the phase reference of the signal to be detected in the following interval. This establishes a new phase reference during each baud period. Carrier phase shifts can be many times faster than the message rate and still be properly received by a DPSK receiver. Since high noise periods nearly always coincide with high load periods, it is desirable that such a reliable transmission technique be employed to insure that load control functions and time of day rate changes are accurately carried out at these times.

Typical prior art DSPK demodulators are shown in U.S. Pat. No. 4,225,964 issued to Cagle and Weeren. Such DPSK demodulators utilized four sets of analog integrators and accompanying digital to analog circuitry to perform the required integrations. Such prior art systems typically utilized operational amplifier integrators to integrate the inphase and quadrature reference signals at the carrier frequency. The section of the received signal waveform being integrated varies according to the phase relationship between the received signal and the inphase or quadrature reference signal driving the integrator. The outputs of the four analog integrators are multiplexed and supplied to one input of a voltage comparator. The other input of the voltage comparator is supplied by the analog output of a digital to analog converter.

The output of the digital to analog converter is compared to the output of the addressed integrator circuit. The output of the voltage comparator is a logic one if the integrator output is less positive than the digital to analog converter output. The comparator output is a logic zero if the integrator output is more positive than the converter output. The "one-zero" output of the voltage comparator is applied to an input of a modem microprocessor which, in turn, supplies an eight bit address that controls the analog output of the digital to analog converter. In brief, the system uses a digital to analog converter and a voltage comparator to perform an analog to digital conversion on the integrator outputs. The result is a digital word representing the in-phase or quadrature component of the message bit.

Although such analog systems perform satisfactorily, they require a relatively large amount of hardware and are correspondingly relatively expensive to manufacture.

It is therefore an object of the present invention to provide an apparatus for demodulating commands transmitted by means of a differential phase shift keyed signal, which apparatus comprises relatively fewer components than the above described prior art apparatus.

It is another object of the present invention to provide an apparatus for reliably receiving commands over a noisy transmission system, which apparatus is relatively inexpensive to manufacture.

It is yet another object of the present invention to provide an apparatus for demodulating commands which have been modulated onto a carrier using differential phase shift keying techniques and transmitted over electrical power distribution lines, which apparatus comprises fewer components than previously utilized in the comparable apparatus described hereinabove.

It is still another object of the present invention to provide an apparatus for demodulating commands sent over a power line distribution system utilizing a differential phase shift keying modulation technique, which apparatus utilizes digital demodulation techniques.

SUMMARY OF THE INVENTION

These and other objects of the present invention are realized by providing a command receiving apparatus which comprises means for demodulating differential phase shift keyed signals from a carrier frequency. The demodulation means comprises a voltage controlled oscillator which converts the incoming, phase modulated analog signal into a frequency-modulated, digital signal that retains the original phase-encoded, analog information as frequency deviations. This frequency-encoded signal is then quadrature-gated directly into counters. The resulting in-phase and quadrature-phase vector data is extracted in direct digital format, with no analog integrators or analog to digital conversion means being necessary.

DESCRIPTION OF THE PREFERRED EMBODIMENT

Figure 1:
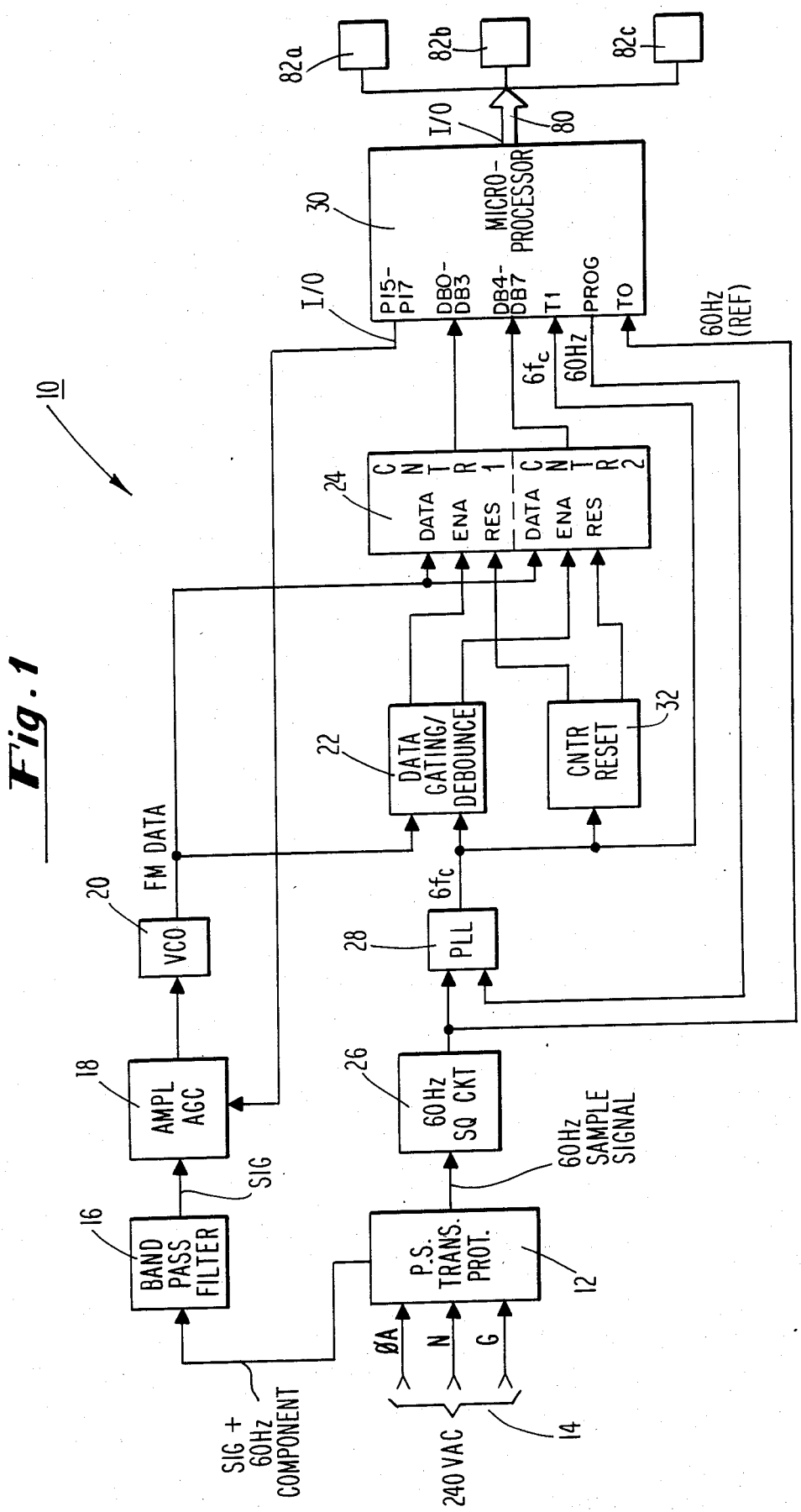
FIG. 1 is a block diagram of a preferred embodiment of the load control receiver apparatus of the present invention.

Referring to FIG. 1, there is shown an apparatus for receiving and demodulating a differential phase shift keyed (DPSK) carrier signal, generally designated 10. The apparatus 10 comprises a power supply/transient protection circuit 12 which is connected to the power distribution line 14, which comprises a phase A conductor (ØA), a neutral conductor (N), and a ground conductor (G). The phase A conductor is energized with 60 Hz a.c. voltage, and the DPSK carrier signal is impressed on this 60 Hz voltage at a distant substation (not shown). A bandpass filter 16 is connected to an output of the transient protection circuit 12. The output of the bandpass filter 16 is connected to an automatic gain control (AGC) amplifier 18. The output of the automatic gain control amplifier is connected to the input of a voltage controlled oscillator 20. The output of the voltage controlled oscillator 20 is connected to the input of a data gating/debounce circuit 22 and the inputs of a dual counter 24.

The power supply/transient protection circuit also generates a 60 Hz sample signal which is connected to a squaring circuit 26. The output of the squaring circuit 26 is connected to a phase-locked loop circuit 28 and a T0 input of a microprocessor 30. In the preferred embodiment, the microprocessor 30 is an Intel type 8049 as shown and described in the Intel Corp. "Microsystems Components Handbook", 1984 Edition, published by the Intel Literature Department of the Intel Corporation, 3065 Bowers Avenue, Santa Clara, Calif. 95051, which publication is incorporated by reference in this description as if fully set forth herein. The output of the phase-locked loop circuit 28 is connected to the data gating/debounce circuit 22, a control reset logic circuit 32, and a T1 input of the microprocessor 30. The output of the data gating/debounce circuit 22 is connected to first and second enable inputs of counter 24. The output from the control reset logic circuit 32 is connected to a first and second reset inputs of the counter 24. Outputs from the counter 24 are connected to data bus DB0–DB7 inputs of the microprocessor 30. The PROG output of the microprocessor 30 is connected to the phase-locked loop circuit 28. A gain control output is connected from I/O ports P15–P17 of the microprocessor to the automatic gain control amplifier 18.

Figure 2:
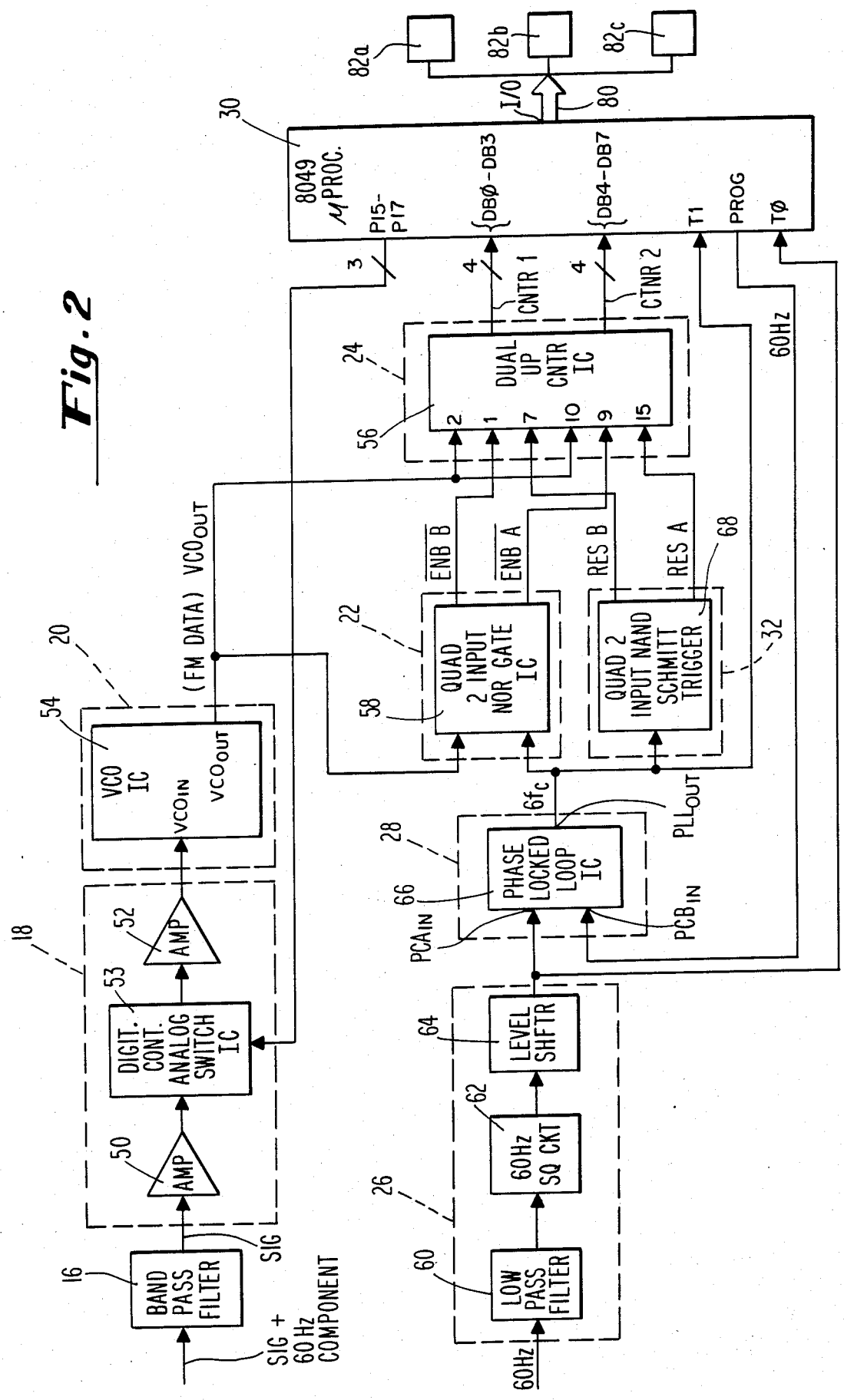
FIG. 2 is a more detailed block diagram of the preferred embodiment of the apparatus of the present invention.

Referring now to FIG. 2, there is shown a more detailed block diagram of the preferred embodiment of the present invention. The DPSK input signal, having a frequency $f_c$ equal to 5180 Hz in the preferred embodiment, is picked off the power line and coupled to the AGC amplifier 18 through the bandpass filter 16. This is preferably accomplished by a tank circuit within the bandpass filter providing front end selectivity and power line isolation, removing the 60 Hz component. The received signal is amplified by the AGC amplifier 18 which comprises a first stage amplifier 50 connected to a second stage amplifier 52 through a digitally controlled analog switch integrated circuit 53. In the preferred embodiment, the operational amplifiers 50 and 52 are each one half of a National Semiconductor type TL 082 or equivalent and the digital controlled analog switch integrated circuit is a Motorola type MC14051B analog multiplexer/demultiplexer as shown and described in the Motorola "CMOS Integrated Circuits" handbook, published by CMOS Marketing, Motorola Semiconductor Products, Inc., 3501 Ed Bluestein Boulevard, Austin, Tex. 78721, which publication is incorporated by reference in this description as if fully set forth herein. The digitally controlled analog switch selects one of a predetermined number, from 0 to 7, of gain levels in response to signals generated by the microprocessor 30 and supplied to circuit 53 through I/O ports of the microprocessor.

The output of the second stage amplifier 52 is coupled to the input of the voltage-controlled oscillator (VCO) 20. In the preferred embodiment the VCO 20, which operates to generate a plurality of pulses at a frequency which varies as a function of the amplitude of the analog input signal, comprises the voltage-controlled oscillator portion of a Motorola-type MC14046B phase-locked loop integrated circuit 54. The output from the second stage amplifier 52 is coupled to the $VCO_{IN}$ terminal of the integrated circuit 54. The VCO produces an output signal $VCO_{OUT}$ whose frequency is linearly related to the voltage amplitude of the input signal at $VCO_{IN}$. When the amplitude of the input signal $VCO_{IN}$ is zero, the $VCO_{OUT}$ signal has a nominal frequency which, in the preferred embodiment, is equal to $60f_c$. The output signal $VCO_{OUT}$ of the VCO 54 is coupled to one input of the data gating/debounce circuit 22 and the enable inputs of the dual counter 24. The dual counter 24 preferably comprises a Motorola-type MC14520B dual up counter 56 and the output $VCO_{OUT}$ from the VCO 54 is coupled to the enable input at pin 2 and the enable input at pin 10 of counter 56. The data gating/debounce circuit 22 preferably comprises a Motorola-type MC14001B quad 2-input NOR gate integrated circuit 58. The 60 Hz squaring circuit 26 comprises a lowpass filter 60, one quarter of a National Semiconductor type LM3302 quad comparator 62 connected as a squaring circuit, and a level shifter 64. The squaring circuit 62 squares the filtered 60 Hz sample from the power supplying and transient protection circuit 12. The level shifter 64 shifts the level of the squared 60 Hz sample for transistor-transistor logic (TTL) compatability.

The output of the level shifter 64 is coupled to the $PCA_{IN}$ input of a Motorola-type MC14046B phase-locked loop integrated circuit 66. The output of the level shifter 64 is also coupled to the T0 input of the microprocessor 30. The output of the phase-locked loop integrated circuit 66 present at the phase-looked loop output ($PLL_{OUT}$) terminal is a signal having a frequency ($6f_c$) equal to six times the frequency $f_c$ of the DPSK input signal. This signal at $PLL_{OUT}$ is coupled to the second input of the data gating/debounce circuit 22 which gates the frequency modulated FM data output from the VCO 20 with the $6f_c$ output from the phase-locked loop integrated circuit 66 into terminals 1 and 9 of the dual upcounter integrated circuit 56, as illustrated in FIGS. 3(f) and (g). The $\overline{ENA}$ and $\overline{ENB}$ inputs to terminals 9 and 1 respectively of the dual upcounter 56 and FM data input to terminals 2 and 10 of the dual upcounter 56 are utilized to ameliorate spurious edge transitions.

Figure 3:
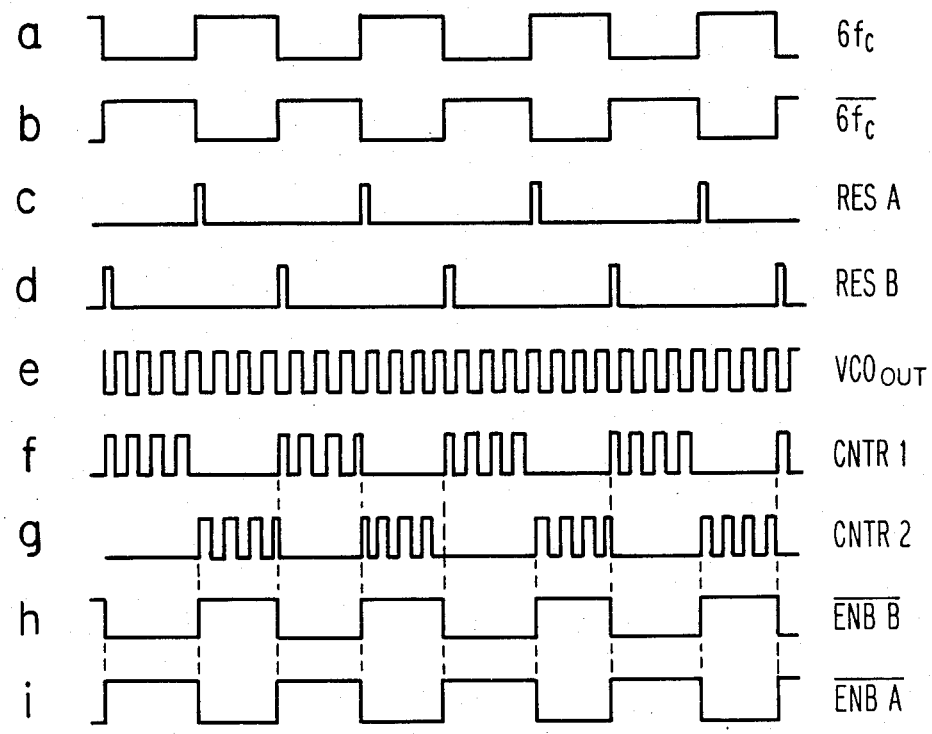
FIG. 3 is a timing diagram depicting various signals generated by the apparatus depicted in the block diagram of FIG. 2.

The $6f_c$ output from the phase-locked loop integrated circuit 66 is also coupled to the counter reset circuit 32 which, in the preferred embodiment, comprises a Motorola type MC14093B quad 2-input "NAND" Schmitt trigger integrated circuit 68. The quad 2-input NAND Schmitt trigger integrated circuit 68 generates short reset pulses (RES A and RES B, each approximately 500 nsec duration in the preferred embodiment) which are coupled to the reset inputs (pins 7 and 15) of the dual up-counter integrated circuit 56 in order to reset the counters during their off period. These pulses are shown as the RES A and RES B signals on the timing diagram depicted in FIGS. 3(c) and 3(d). Referring still to FIG. 3, there is shown, with diagrams (a) through (i), the timing relationship between various signals generated by the apparatus depicted in FIG. 2. The points at which these signals appear in the apparatus, are shown in FIG. 2.

The $6f_c$ output from the phase-locked loop integrated circuit 66 is also coupled to the T1 input of the microprocessor 30. The microprocessor 30 divides the $6f_c$ signal down to 60 Hz and this 60 Hz signal is coupled from the PROG output of the microprocessor 30 to the $PCB_{IN}$ input of the phase-locked loop integrated circuit 66 which enables the phase-locked loop integrated circuit 66 to track frequency variations in the 60 Hz signal.

The preferred embodiment of the present invention operates as follows. Referring to FIG. 2, the DPSK input signal (SIG) modulates the output signal (VCO out) from the VCO integrated circuit 54. The frequency modulated signal (VCO out) is gated by the data gating/debounce circuit 22 into the dual counter 24. Half wave demodulation is implemented by counting over only the positive portions of the sine and cosine quadrature waveforms (see FIG. 5). This half wave demodulation allows the microprocessor 30 to time multiplex its receive-sampling function with its main line tasks during that time when both the sine and cosine quadrature waveforms are zero (see FIGS. 5A and B). The integration periods are gated at $6f_c$, which is six times less than the basic sine and cosine quadrature periods. The sine and cosine components are derived within the microprocessor 30 from summations of the $6f_c$ integration periods which are obtained from the $6f_c$ signal into the microprocessor 30 from the phase-locked loop circuit 28. The $6f_c$ sampling period facilitates phase-locking the counter to 60 Hz and allows the microprocessor 30 to perform the divide-by function for the 60 Hz phase-locked loop.

Figure 4:
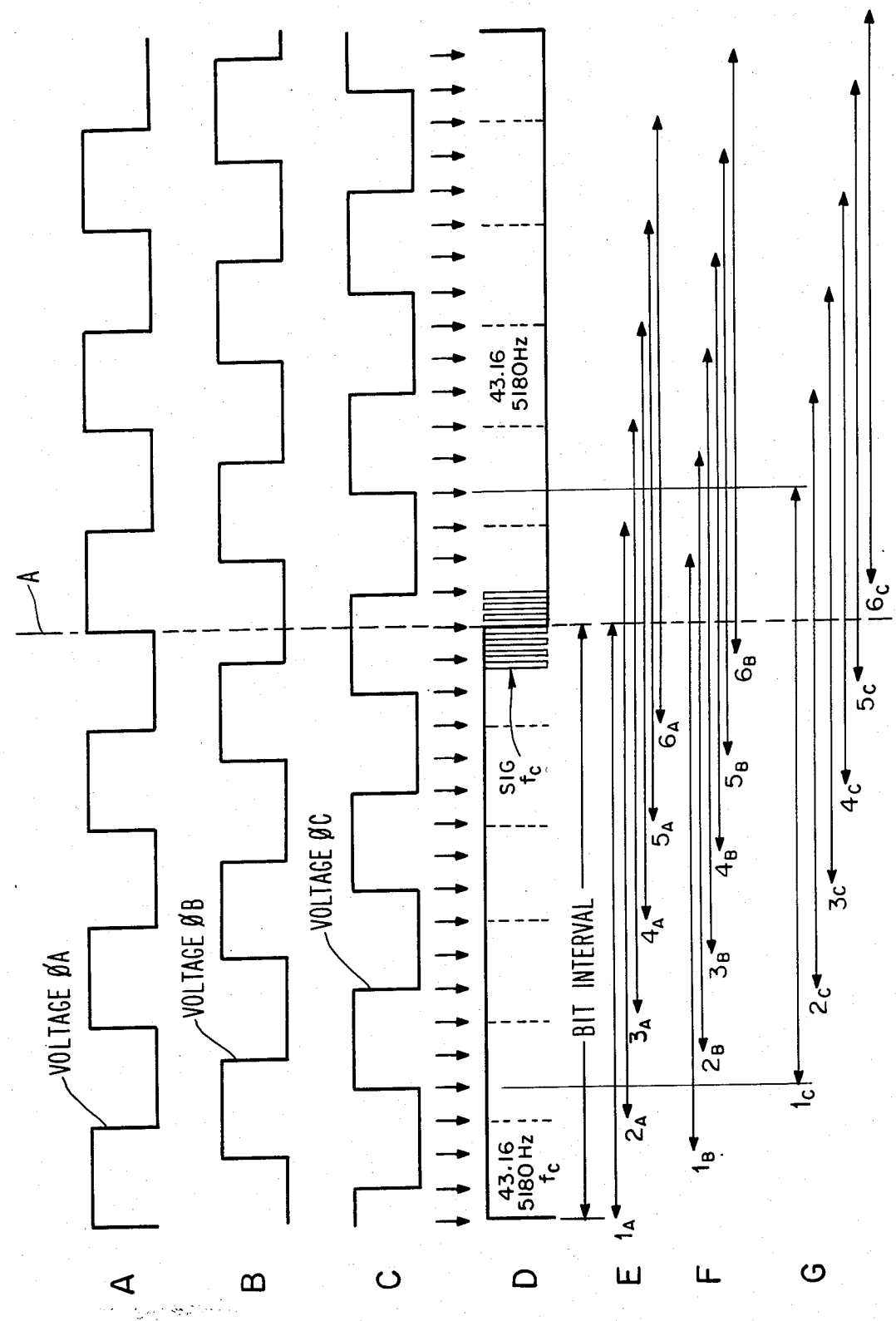
FIG. 4 is a timing diagram depicting waveforms and timing relationships for an example of the operation of a preferred embodiment of the present invention.

Referring to FIG. 4, a specific example of the operation of the preferred embodiment of the present invention is as follows. FIGS. 4A, 4B and 4C show the phase relationships between the A phase, B phase and C phase of the 60 Hz sample appearing in a three phase power distribution circuit. Although it is possible to utilize any one of the A, B or C phases, for the specific example described hereinafter, the A phase has been selected. FIG. 4D shows the information waveform which transmits information at 20 bits per second (BPS). FIG. 4E shows the 6 overlapping bit timing channels for the A phase, FIG. 4F shows the overlapping six bit timing channels for the B phase; and FIG. 4G shows the overlapping six bit timing channels for the C phase. Since the start of the 20 BPS signal could occur at any 60 Hz leading or rising edge, there are six possible edges within a bit frame. Since decoding through a particular 60 Hz edge will not always match exactly with the start of the transmitting signal, the preferred embodiment decodes all six possible edge transitions. As soon as a predetermined bit pattern appears on any particular channel, the remainder of the decoding proceeds.

Referring to FIG. 5, FIGS. 5A, 5B and 5C show the phase relationships between the in phase carrier waveform $f_c(I)$, the quadrature phase carrier waveform $f_c(Q)$; and the carrier frequency signal wave form $f_c$ respectively. FIG. 5D shows the phase relationship between the $f_c$ waveform and the $6f_c$ wave form. FIG. 5E depicts an example of the VCO OUT counts which are counted within each interval of the $6f_c$ enabling signal.

Figure 5:
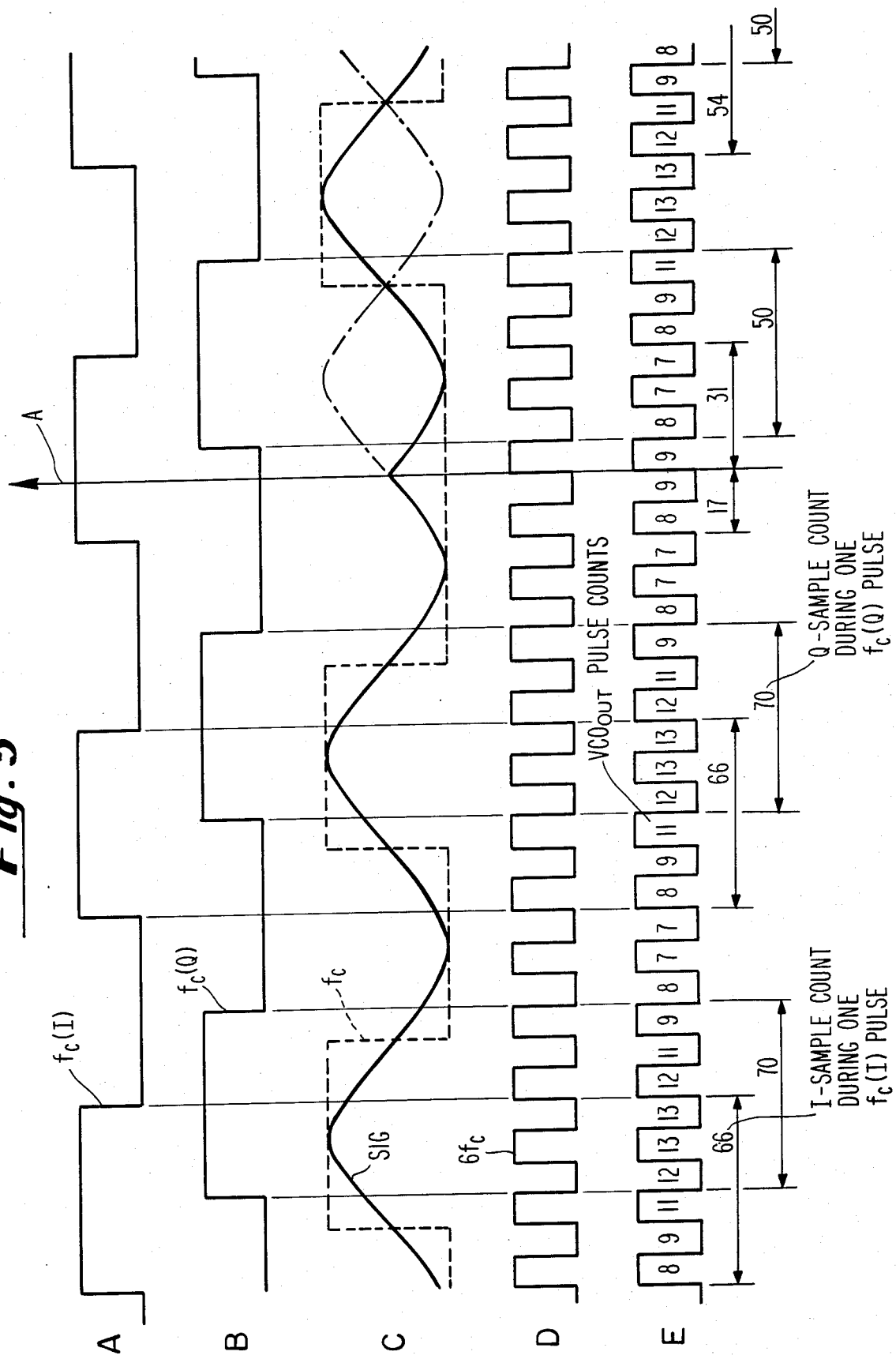
FIG. 5 is a timing diagram depicting an enlargement of a portion of the waveform of FIG. 4D.

As shown in FIG. 5, the dual up-counter 56 (see FIG. 2) counts the VCO output pulses during the positive portion of the in-phase waveform $f_c(I)$ (I-sample count) and the quadrature phase waveform $f_c(Q)$ (Q-sample count). The I-sample count is input to the microprocessor 30 through input terminals DB0-DB3 while the Q-sample count is input to the microprocessor 30 through input terminals DB4-DB7. The I and Q sample counts are repeated during each positive portion of the $f_c(I)$ and $f_c(Q)$ waveforms.

As previously stated, the information bit rate is 20 bits per second (BPS) in the preferred embodiment. In the differential phase shift keying form of modulation, the reference phase for a given keying interval is the phase of the signal during the preceding keying interval. Whenever there is a change between the preceding bit value and the present bit value, there is a change in phase. Likewise, when the preceding bit value and the present bit value is the same, the phase remains unchanged. Referring to FIG. 5C, an example is shown where the phase shifts at the end of a 20 BPS interval represented by vertical line A. The operation of the system, with respect to such phase shift, is more clearly shown in the enlargement of FIG. 4D which is depicted in FIG. 5. It can be seen by the solid line sinusoidal waveform of FIG. 5C, that a 180° phase shift occurs at the end of the 20 bits per second (BPS) interval (vertical line A), representing a change in bit value.

FIG. 5E diagrammatically represents the counts made by the dual up-counter 56 and coupled to the DB0-DB3 and DB4-DB7 inputs of the microprocessor 30. As previously stated, the in-phase sample is counted only during the positive portions of the in-phase waveform $f_c(I)$. The VCO$_{OUT}$ pulse counts made by the dual up-counter 56 during each $6f_c$ pulse interval are input to the microprocessor 30 which then sums the VCO$_{OUT}$ pulse counts over the six $6f_c$ pulse intervals which coincide with the positive portion of the in-phase waveform $f_c(I)$. In the example depicted in FIG. 5E, the pulse counts output by the dual up-counter 56 during the pulse intervals which coincide with the positive portion of the in-phase waveform $f_c(I)$ are 8, 9, 11, 12, 13 and 13 which the microprocessor sums to 66. Similarly, the dual up-counter 56 outputs pulse counts made during each $6f_c$ pulse interval to the microprocessor 30 which then sums these VCO$_{OUT}$ pulse counts over the six $6f_c$ pulse intervals which coincide with the positive portion of the quadrature phase waveform $f_c(Q)$. In the example shown in FIG. 5E, these pulse counts are 12, 13, 13, 12, 11, and 9 which the microprocessor 30 sums to 70.

As can be seen in FIG. 5, as long as there is no phase shift in the signal waveform $f_c$, the pulse count sums remain substantially the same; that is, 66 for the in-phase sample and 70 for the quadrature sample. At the end of the 20 BPS bit interval, represented by vertical line A, all of the counters are reset and, as can be seen in FIG. 5E, new counts begin. Since the amplitude of the waveform has changed in value due to the 180° phase shift during the measurement intervals, the sum of the pulses output by the VCO 54 during the positive portions of the $f_c(I)$ and $f_c(Q)$ waveforms will correspondingly change. As shown in FIG. 5E, the sum of the pulses occurring during the quadrature waveform $f_c(Q)$ interval now total 50 instead of 70. During the next full count interval with respect to the in-phase waveform $f_c$ (I) interval, the count totals 54. These counts will remain substantially the same until another phase shift occurs.

In accordance with the algorithm carried out by the microprocessor 30, which algorithm is set forth in Table 1, the product of the number of pulses nominally contained within each positive waveform interval (60 pulses nominal in the preferred embodiment) and the number of positive waveform intervals within each sub-internal of the bit interval (approximately 43 in the preferred embodiment) is subtracted from the product of the number of actual pulses in the VCO output signal which occur within each counting interval (66 for the in-phase sample and 70 for the quadrature sample as set forth in the example shown in FIG. 5E) times the number of positive waveform intervals within each sub-interval of the bit interval (approximately 43 in the present example).

A negative sign for the SIGMA function (see step 5 of the algorithm listed in table 1) indicates a phase transition. For the example shown in FIG. 5, prior to the phase change, the in-phase difference (PASTI) is +258 ($66 \times 43 - 60 \times 43 = +258$) and the quadrature phase difference (PASTQ) is +430 ($70 \times 43 - 60 \times 43 = +430$). Following the phase transition, the in-phase difference (SUMI) is −258 ($54 \times 43 - 60 \times 43 = -258$) and the quadrature phase difference (SUMQ) is −430 ($50 \times 43 - 60 \times 43 = -430$). Consequently, the sign of the SIGMA function (see step 5 in Table 1) is minus [(SUMI=−258)×(PASTI=+258)+(SUMQ=−430)×(PASTQ=+430)]. If there were no phase change at the end of the bit interval, SUMI would remain +258 for the in-phase sample and SUMQ would remain +430 for the quadrature sample. Therefore, the SIGMA function would be positive [(SUMI=+258)×(PASTI=+258)+(SUMQ=+430)×(PASTQ=+430)]. The microprocessor 30 recognizes this negative value of SIGMA as a phase transistion and therefore indicates a received bit value of 0. Where SIGMA has a positive value, the microprocessor 30 recognizes a received bit value of 1.

In a conventional manner, the microprocessor 30 stores the received bit, following which another cycle of demodulation stats and another bit is thereafter derived in the same manner is described above and is also stored. On each subsequent bit interval, another cycle of demodulation is started anew and a new bit is thereafter derived and stored. In this manner, a command is developed in a predetermined command format. This command is delivered through an I/O port 80 of the microprocessor 30 to activate or deactivate one or more control devices 82a, 82b or 82c (see FIGS. 1 and 2) which may, for example, be relays.

As can be seen from the above description, the apparatus in accordance with the present invention is able to demodulate commands which have been modulated onto a carrier using differential phase shift keying techniques, utilizing an appropriate gated counter which counts the pulse output by a voltage controlled oscillator, which pulse count varies in accordance with the magnitude of the input analog waveform. Each time a phase shift occurs, indicating a 0 bit value, the VCO pulse count changes sign. If at the end of the bit interval there is no change in pulse count, the sign remains the same indicating a bit value of 1.

While the invention has been described primarily in terms of the specific preferred embodiment, it is not to be limited thereto, but rather only to the extent set forth hereinafter in the claims which follow.

TABLE 1
1. WAIT FOR NEXT 60 HZ EDGE
2. READ I - SAMPLE; LOAD IT INTO I(1)
   READ Q - SAMPLE; LOAD IT INTO Q(1)
3. SET SUMI = 0
   SUMQ = 0
   PASTI = 0

TABLE 1-continued
   PASTQ = 0
4. FOR N = 1 TO 6
   SET SUMI = SUMI + I(N)
   SUMQ = SUMQ + Q(N)
   PASTI = PASTI + I(N+6)
   PASTQ = PASTQ + Q(N+6)
   NEXT N
5. SET BIT = SIGMA (SUMI * PASTI + SUMQ * PASTQ)
6. FOR N = 12 TO 2 STEP −1
   SET I(N) = I(N−1)
   Q(N) = Q(N−1)
   NEXT N
7. GO TO 1

Notes:
SUMI = first in-phase sample count
PASTI = second in-phase sample count
SUMQ = first quadrature phase sample count
PASTQ = second quadrature phase sample count
All the counts refer to the nominal reference count.

What is claimed is:

1. An apparatus for demodulating differential phase shift keyed signals, said apparatus comprising:
   (a) means for receiving a differential phase shift keyed analog signal;
   (b) means for generating a plurality of pulses at a frequency which varies as a function of the amplitude of said analog signal;
   (c) means for counting said pulses during predetermined in-phase intervals and intervals which are quadrature phase related to said in-phase intervals;
   (d) means for determining an in-phase sample difference between (i) the number of in-phase interval pulses counted during a counting period in each of a plurality of successive bit intervals and (ii) a reference pulse count number, and for determining the sign of said in-phase sample difference;
   (e) means for determining a quadrature-phase sample difference between (i) the number of quadrature-phase interval pulses counted during said counting period in each of said plurality of successive bit intervals and (ii) said reference pulse count number, and for determining the sign of said quadrature-phase sample difference; and
   (f) means for indicating a phase change when the signs of said in-phase sample difference and said quadrature-phase sample difference on any of said bit intervals are different from the signs of said in-phase and quadrature phase sample differences, respectively, on an immediately-preceding bit interval.

2. The apparatus in accordance with claim 1 wherein said pulse generating means comprises a voltage controlled oscillator.

3. The apparatus in accordance with claim 1 additionally comprising means for generating a bit having a first value when said signs of said in-phase sample and quadrature phase sample differences on said any of said bit intervals are different from the signs of said in-phase sample and quadrature phase sample differences, respectively, on said immediately preceding bit interval and for generating a bit having a second value, different from said first value, when said signs remain the same.

4. The apparatus in accordance with claim 3 further comprising means for storing said generated bits in a predetermined command format.

5. The apparatus in accordance with claim 4 additionally comprising means for executing said commands.

6. The apparatus in accordance with claim 5 wherein said means for executing said commands comprises means for generating at least one control signal.

7. A load control receiver for interrupting and reconnecting power to customer loads as a result of commands transmitted in the form of differential phase shift keyed signals, said receiver comprising:

(a) means for receiving a differential phase shift keyed analog signal;

(b) means for generating a plurality of pulses at a frequency which varies as a function of the amplitude of said analog signal;

(c) means for counting said pulses during predetermined in-phase intervals and intervals which are quadrature phase related to said in-phase intervals;

(d) means for determining a first in-phase sample difference between (i) the number of in-phase interval pulses counted during at least a portion of one bit interval and (ii) a reference pulse count number, and means for determining the sign of said first in-phase sample difference;

(e) means for determining a first quadrature phase sample difference between (i) the number of quadrature phase interval pulses counted during said portion of said one bit interval and (ii) said reference pulse count number, and means for determining the sign of said first quadrature phase sample difference;

(f) means for determining a second in-phase sample difference between the number of in-phase interval pulses counted during at least a portion of another bit interval following said one bit interval, and said reference pulse count number, and means for determining the sign of said second in-phase sample difference;

(g) means for determining a second quadrature phase sample difference between the number of quadrature phase interval pulses counted during said portion of said other bit interval and said reference pulse count number, and means for determining the sign of said second quadrature phase sample difference;

(h) means for generating a bit having a first value when said signs of said second in-phase sample and quadrature phase sample differences are different from the signs of said first in-phase sample and quadrature phase sample differences, respectively, and means for generating a bit having a second value, different from said first value, when said signs remain the same;

(i) means for generating bits on subsequent bit intervals in the same manner as defined hereinabove in (d), (e), (f), and (g); and (j) means for storing said generated bits as a command in a predetermined command format.

8. The apparatus in accordance with claim 7 wherein said pulse generating means comprises a voltage controlled oscillator.

9. The apparatus in accordance with claim 7 wherein means for executing said commands comprises means for generating at least one control signal.

10. The apparatus in accordance with claim 9 additionally comprising means for switching at least one electrical load in response to said control signal.

* * * * *